(12) United States Patent
Frampton et al.

(10) Patent No.: US 8,963,508 B2
(45) Date of Patent: Feb. 24, 2015

(54) METHOD OF CONTROLLING SPEED OF A VARIABLE SPEED GENERATOR

(75) Inventors: Isaac S. Frampton, Strattanville, PA (US); Eric D. Albsmeier, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 279 days.

(21) Appl. No.: 13/450,770

(22) Filed: Apr. 19, 2012

(65) Prior Publication Data

US 2013/0278228 A1    Oct. 24, 2013

(51) Int. Cl.
*H02P 11/00*    (2006.01)

(52) U.S. Cl.
USPC .............................................. 322/29; 322/44

(58) Field of Classification Search
CPC .................................. H02P 9/04; H09P 9/102
USPC .............................. 322/29, 20, 44; 290/40 C
See application file for complete search history.

(56) References Cited

U.S. PATENT DOCUMENTS

| | | | | |
|---|---|---|---|---|
| 3,611,039 A * | 10/1971 | Sakamoto | ...................... | 361/51 |
| 4,023,082 A | 5/1977 | Tanikoshi | | |
| 4,184,083 A | 1/1980 | Takeuchi | | |
| 4,185,203 A | 1/1980 | Takeuchi | | |
| 4,292,534 A | 9/1981 | Diegel et al. | | |
| 4,427,896 A * | 1/1984 | Waldron | ...................... | 290/40 R |
| 4,661,760 A * | 4/1987 | Goto et al. | ...................... | 322/27 |
| 4,749,944 A * | 6/1988 | Okamoto | ................. | 324/765.01 |
| 4,988,941 A | 1/1991 | Fox | | |
| 4,994,684 A | 2/1991 | Lauw et al. | | |
| 5,608,309 A * | 3/1997 | Hikita et al. | ...................... | 322/28 |
| 5,703,410 A * | 12/1997 | Maekawa | ...................... | 290/40 C |
| 6,014,015 A * | 1/2000 | Thorne et al. | ................... | 322/15 |
| 6,175,217 B1 * | 1/2001 | Da Ponte et al. | ................ | 322/19 |
| 6,230,479 B1 * | 5/2001 | Kawamura et al. | ............. | 60/773 |
| 6,348,743 B1 * | 2/2002 | Sakasai et al. | .............. | 290/40 B |
| 6,686,718 B2 | 2/2004 | Jadric et al. | | |
| 6,737,762 B2 | 5/2004 | Koenig | | |
| 6,831,464 B2 | 12/2004 | Yang | | |
| 7,121,257 B2 | 10/2006 | Dolker | | |
| 7,150,263 B2 | 12/2006 | Kishi et al. | | |
| 7,352,072 B2 | 4/2008 | Dolker et al. | | |
| 7,369,417 B2 | 5/2008 | Morcov et al. | | |
| 7,508,089 B2 | 3/2009 | Guang et al. | | |
| 7,573,145 B2 | 8/2009 | Peterson | | |
| 7,855,466 B2 | 12/2010 | Bax | | |
| 7,880,331 B2 | 2/2011 | Bax et al. | | |
| 7,999,405 B2 | 8/2011 | Peterson | | |
| 8,022,572 B2 | 9/2011 | Vyas et al. | | |
| 8,115,445 B2 | 2/2012 | Oyake et al. | | |
| 8,125,094 B2 | 2/2012 | Radtke et al. | | |
| 2004/0084965 A1 | 5/2004 | Welches et al. | | |
| 2006/0066113 A1 * | 3/2006 | Ebrahim et al. | ................ | 290/52 |
| 2008/0157600 A1 | 7/2008 | Marlenee et al. | | |
| 2008/0157724 A1 * | 7/2008 | Fattal | ................ | 322/7 |
| 2009/0140576 A1 | 6/2009 | Yu et al. | | |
| 2010/0283252 A1 * | 11/2010 | Fradella | ......................... | 290/55 |
| 2011/0101778 A1 | 5/2011 | Yang | | |
| 2011/0215641 A1 | 9/2011 | Peterson et al. | | |
| 2011/0273129 A1 | 11/2011 | Coe et al. | | |
| 2012/0139264 A1 * | 6/2012 | Riihimaki | ................... | 290/40 B |

* cited by examiner

*Primary Examiner* — Julio C. Gonzalez
(74) *Attorney, Agent, or Firm* — Schwegman Lundberg & Woessner, P.A.

(57) ABSTRACT

Some embodiments relate to a method of controlling speed of a variable speed generator. The method includes detecting a load of the variable speed generator and determining a target speed for the variable speed generator based on the load supplied by the variable speed generator. The method further includes using a controller to adjust the speed of the variable speed generator based on the target speed. The method may further include correcting the target speed by calculating a correction factor that corrects the target speed based on a voltage produced by the variable speed generator.

11 Claims, 4 Drawing Sheets

METHOD OF CONTROLLING SPEED OF A VARIABLE SPEED GENERATOR

TECHNICAL FIELD

Embodiments pertain to a method of controlling generator speed, and more particularly to a method of controlling speed of a variable speed generator using a measured load of the variable speed generator.

BACKGROUND

Variable speed generators are typically used to provide DC power because the frequency of their AC output varies. A typical variable speed generator requires dynamic adjustments to the speed of the variable speed generator in order to maintain a constant output voltage with corresponding dynamic changes in output power.

FIG. 2 is a schematic diagram of a typical prior art control system 100 for a variable speed generator 101. The speed of variable speed generators is typically controlled based on the output voltage of the variable speed generator. Output voltage has historically been used as the feedback to the speed controller since constant output voltage is desired.

One of the drawbacks with adjusting the speed of a variable speed generator based on the output voltage is that existing systems correct the speed more slowly than desired in order to maintain stability. Stability is sometimes difficult to maintain on a variable speed generator because the actual speed of the variable speed generator lags the target speed of the variable speed generator resulting in a slower, more lethargic system.

Another drawback with adjusting the speed of a variable speed generator based on the output voltage is that it is difficult to limit the load on the variable speed generator to a desired set point. It is typically desirable to limit the load on the variable speed generator to prevent damage to the variable speed generator.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 3:
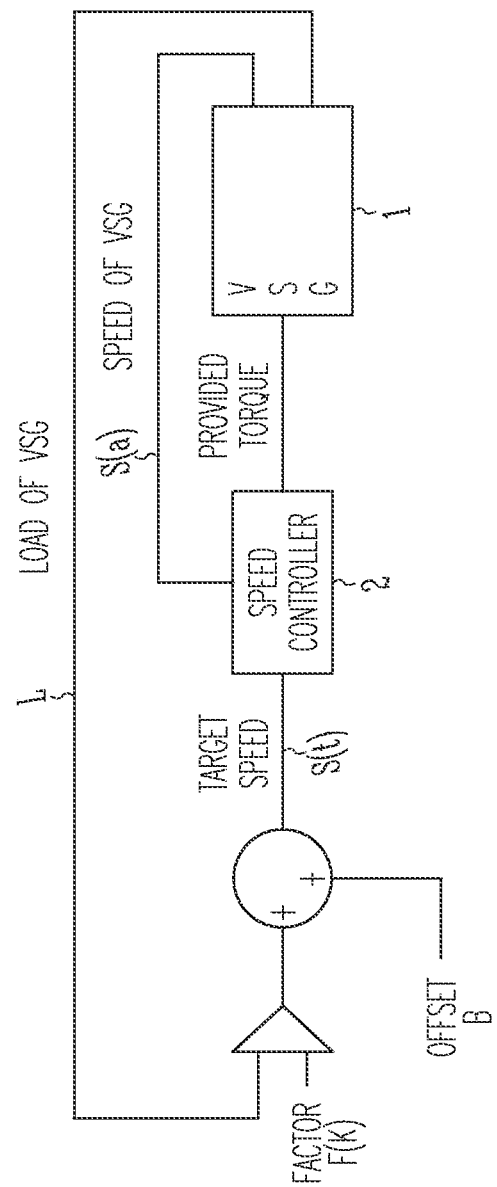
FIG. 3 is a schematic diagram of an example control system that controls the speed of a variable speed generator based only on the load provided by the variable speed generator.

An example method of controlling speed of a variable speed generator 1 will now be described with reference to FIG. 3. The method includes detecting a load L provided by the variable speed generator 1 and determining a target speed S(t) for the variable speed generator 1 based on the load L supplied by the variable speed generator 1. The method further includes using a controller 2 to adjust the actual speed S(a) of the variable speed generator based on the target speed S(t).

In some embodiments, detecting a load L supplied by the variable speed generator 1 includes sensing AC current produced by the variable speed generator 1. In other embodiments, detecting a load L supplied by the variable speed generator 1 includes sensing DC current produced by the variable speed generator 1.

Embodiments are also contemplated where detecting a load L supplied by the variable speed generator 1 includes sensing power produced by the variable speed generator. In addition, it should be noted that the controller 2 may be used to detect the load L supplied by the variable speed generator 1.

Figure 1:
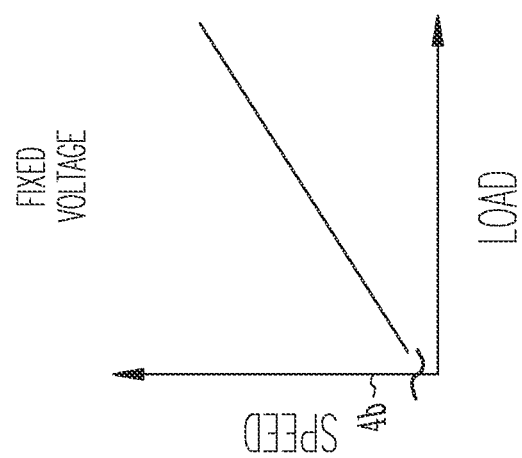
FIG. 1 illustrates some characteristics of an example variable speed generator with respect to voltage load and speed.
Figure 1:
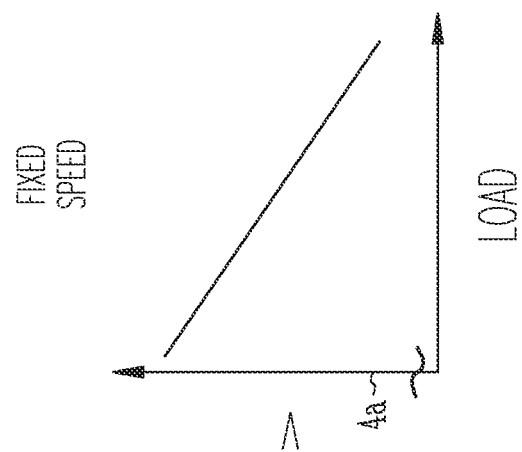
Figure 2:
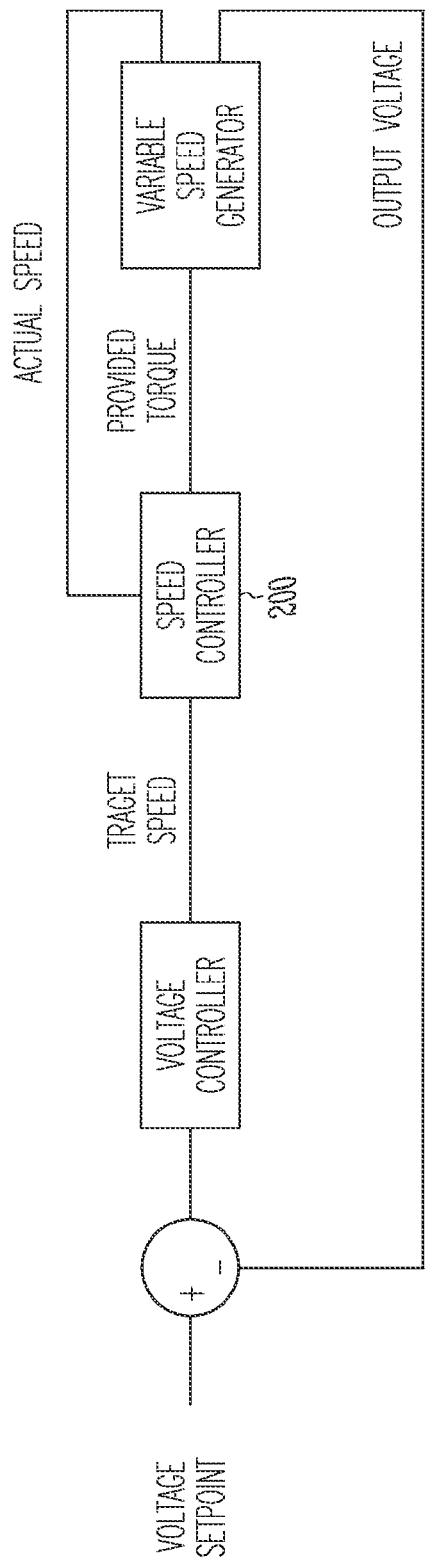
FIG. 2 is a schematic diagram of a prior art control system for a variable speed generator where the speed is controlled based on voltage feedback.

In some embodiments, determining a target speed S(t) for the variable speed generator 1 based supplied by the load L on the variable speed generator 1 includes determining a target speed S(t) from a data table. As an example, determining a target speed S(t) from a data table may include performing linear interpolation from a two-point data table (see e.g., data table 4B in FIG. 1). Embodiments are also contemplated where determining a target speed S(t) for the variable speed generator 1 based on the load L supplied by the variable speed generator 1 includes multiplying the load L by a factor F(k) and adding an offset B (see, e.g., FIG. 3).

Calculating a target speed based on load L allows a quicker, more stable response in speed to changes in load L. This response to changes in load L is relatively quicker and more stable than a closed loop control system which is based on measured voltage.

Figure 4:
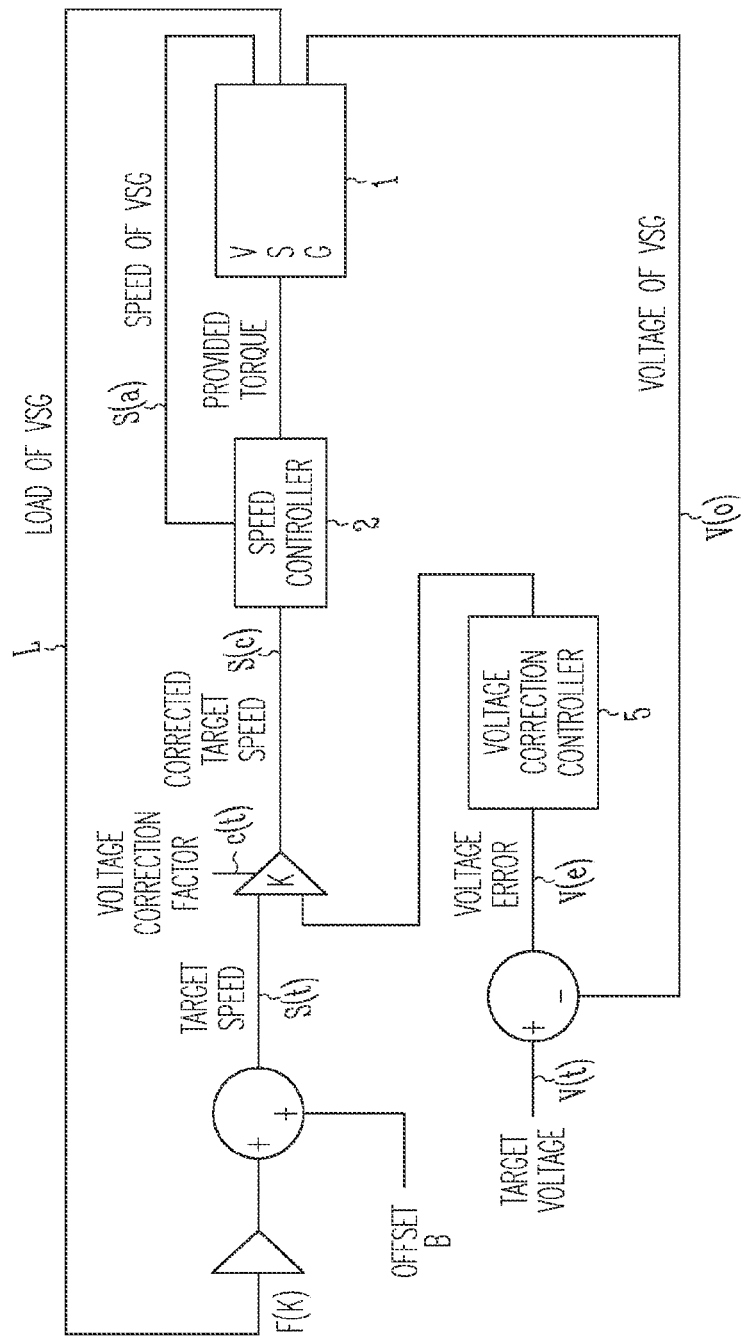
FIG. 4 is a schematic diagram of another example control system that controls the speed of a variable speed generator based on the load on the variable speed generator and includes a correction based on output voltage of the variable speed generator.

In the example embodiment that is illustrated in FIG. 4, the method may further include correcting the target speed S(t) to create a corrected target speed S(c). In some embodiments, the corrected target speed S(c) is calculated by scaling the target speed S(t) by the correction factor C(f).

In the example embodiment that is illustrated in FIG. 4, the correction factor C(f) is calculated using voltage correction controller 5. The voltage correction controller 5 adjusts the correction factor C(f) based on a voltage error V(e), which is the difference between a target voltage V(t) and an output voltage V(o) produced by the variable speed generator 1. It should be noted that embodiments are contemplated where the target voltage V(t) is adjustable. In some embodiments, the voltage correction controller 5 includes a proportional-derivative controller that adjusts the correction factor C(f) based on the voltage error V(e).

In some embodiments, determining a target speed S(t) for the variable speed generator 1 based on the load L supplied by the variable speed generator 1 includes increasing the target speed S(t) with increasing load until the load exceeds a predetermined level. It should be noted that embodiments are contemplated where the predetermined level is adjustable. This embodiment provides an example of controlling the output voltage V(o) of the variable speed generator 1.

In other embodiments, determining a target speed S(t) for the variable speed generator 1 based on the load L supplied by the variable speed generator 1 may include decreasing the target speed S(t) when the load L exceeds a predetermined level. It should be noted that embodiments are contemplated where the predetermined level is adjustable. This embodiment provides an example of controlling the load L supplied by the variable speed generator 1.

The method of controlling speed of a variable speed generator using a measured load supplied by the variable speed generator described herein may provide improved response to changing loads on a variable speed generator. In addition, the methods may provide improved load limiting control on a variable speed generator.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of controlling speed of a variable speed generator comprising:
   detecting a load supplied by the variable speed generator;
   determining a target speed for the variable speed generator based on the load supplied by the variable speed generator;
   using a controller to adjust the speed of the variable speed generator based on the target speed; and
   correcting the target speed including calculating a correction factor that corrects the target speed based on a voltage produced by the variable speed generator, and wherein calculating a correction factor that corrects the target speed based on a voltage produced by the variable speed generator includes scaling the target speed by the correction factor.

2. The method of claim 1, wherein detecting a load supplied by the variable speed generator includes sensing AC current produced by the variable speed generator.

3. The method of claim 1, wherein detecting a load supplied by the variable speed generator includes sensing DC current produced by the variable speed generator.

4. The method of claim 1, wherein detecting a load supplied by the variable speed generator includes sensing power produced by the variable speed generator.

5. The method of claim 1, wherein detecting a load supplied by the variable speed generator includes using the controller to detect the load on the variable speed generator.

6. The method of claim 1, wherein determining a target speed for the variable speed generator based on the load supplied by the variable speed generator includes determining a target speed from a data table.

7. The method of claim 6, wherein determining a target speed from a data table includes performing linear interpolation from a two-point data table.

8. The method of claim 1, wherein determining a target speed for the variable speed generator based on the load supplied by the variable speed generator includes multiplying the load by a factor and adding an offset.

9. The method of claim 1, wherein correcting the target speed includes using a proportional-derivative controller to correct the target speed.

10. A power generation system comprising:
    a variable speed generator that operates at different speeds and is configured to provide power to a load;
    a controller that detects the load supplied with power by the variable speed generator, wherein the controller determines a target speed for the variable speed generator based on the load supplied with power by the variable speed generator, and
    wherein the controller adjusts the speed of the variable speed generator based on the determined target speed of the variable speed generator, wherein the controller corrects the determined target speed, wherein the controller corrects the target speed by calculating a correction factor that corrects the target speed based on a voltage produced by the variable speed generator, wherein the controller corrects the target speed by calculating a correction factor that corrects the target speed based on a voltage produced by the variable speed generator, and wherein the controller calculates the correction factor that corrects the target speed based on a voltage produced by the variable speed generator and scales the target speed by the correction factor.

11. The power generation system of claim 10, wherein the controller senses power produced by the variable speed generator to detect the load supplied by the variable speed generator.

* * * * *